(12) United States Patent
Bovik et al.

(10) Patent No.: US 10,497,396 B2
(45) Date of Patent: Dec. 3, 2019

(54) DETECTING AND CORRECTING WHITEBOARD IMAGES WHILE ENABLING THE REMOVAL OF THE SPEAKER

(71) Applicant: Board of Regents, The University of Texas System, Austin, TX (US)

(72) Inventors: Alan Bovik, Austin, TX (US); Casen Hunger, Austin, TX (US); Zichong Li, Austin, TX (US); Mitchell Crooks, Austin, TX (US); Mark Meserve, Austin, TX (US); Edward Mora, Austin, TX (US); Mike Webb, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/761,881

(22) PCT Filed: Aug. 31, 2016

(86) PCT No.: PCT/US2016/049593
§ 371 (c)(1),
(2) Date: Mar. 21, 2018

(87) PCT Pub. No.: WO2017/053032
PCT Pub. Date: Mar. 30, 2017

(65) Prior Publication Data
US 2018/0268864 A1    Sep. 20, 2018

Related U.S. Application Data

(60) Provisional application No. 62/221,777, filed on Sep. 22, 2015.

(51) Int. Cl.
*G11B 27/00* (2006.01)
*G06K 3/00* (2006.01)
*G11B 27/10* (2006.01)

(52) U.S. Cl.
CPC .............. *G11B 27/002* (2013.01); *G06K 3/00* (2013.01); *G11B 27/105* (2013.01); *G11B 2220/2537* (2013.01)

(58) Field of Classification Search
CPC ..... G11B 27/002; G11B 27/00; G11B 27/105; G11B 2220/2537; G06K 3/00; G06T 7/12; G06T 7/254
See application file for complete search history.

(56) References Cited

U.S. PATENT DOCUMENTS

| | | |
|---|---|---|
| 7,171,056 B2 | 1/2007 | Zhang et al. |
| 7,426,297 B2 | 9/2008 | Zhang et al. |

(Continued)

OTHER PUBLICATIONS

International Search Report for International Application No. PCT/US2016/049593 dated Nov. 21, 2016, pp. 1-2.

(Continued)

*Primary Examiner* — Mishawn N. Hunter
(74) *Attorney, Agent, or Firm* — Robert A. Voigt, Jr.; Winstead, P.C.

(57) ABSTRACT

A method, system and computer program product for improving the recording of classroom lectures or other such presentations. A video frame containing a whiteboard image is converted into a black and white image for the detection of boundaries. These boundaries are classified as horizontal or vertical lines. Quadrangles are then formed using spatial arrangements of these lines. The quadrangles that are most likely to spatially coincide with the boundaries of the whiteboard image are identified. The quadrangles are then sorted (ranked) based on specific characteristics, such as size and position. The area corresponding to the identified quadrangle in the video frame is then cropped. Furthermore, the speaker in the video frame can be removed based on detecting changes that are characteristic of movements of a speaker. In this manner, the visual and educational experi- (Continued)

ence involved in the recording of classroom lectures or other such presentation is improved.

24 Claims, 6 Drawing Sheets

(56) References Cited

U.S. PATENT DOCUMENTS

| | | | |
|---|---|---|---|
| 9,569,689 B2* | 2/2017 | Kato | G06T 5/008 |
| 2004/0165786 A1* | 8/2004 | Zhang | G06K 9/32 |
| | | | 382/276 |
| 2007/0156816 A1* | 7/2007 | Zhang | G06F 3/017 |
| | | | 709/204 |
| 2011/0274353 A1* | 11/2011 | Yu | G06K 9/00664 |
| | | | 382/173 |
| 2013/0070122 A1* | 3/2013 | Nijemcevic | G06K 9/3216 |
| | | | 348/239 |
| 2015/0077326 A1* | 3/2015 | Kramer | G06F 3/0325 |
| | | | 345/156 |
| 2015/0135137 A1* | 5/2015 | Miwa | G06T 11/60 |
| | | | 715/808 |

OTHER PUBLICATIONS

Written Opinion of the International Searching Authority for International Application No. PCT/US2016/049593 dated Nov. 21, 2016, pp. 1-5.
Zhang et al., "Whiteboard Scanning and Image Enhancement," Digital Signal Processing, vol. 17, 2007, pp. 414-432.
International Preliminary Report on Patentability for International Application No. PCT/US2016/049593 dated Mar. 27, 2018, pp. 1-6.

* cited by examiner

DETECTING AND CORRECTING WHITEBOARD IMAGES WHILE ENABLING THE REMOVAL OF THE SPEAKER

CROSS REFERENCE TO RELATED APPLICATIONS

This application claims priority to U.S. Provisional Patent Application Ser. No. 62/221,777, entitled "Detecting and Correcting Whiteboard Images While Enabling the Removal of the Speaker," filed Sep. 22, 2015, which is incorporated by reference herein in its entirety.

TECHNICAL FIELD

The present invention relates generally to recording classroom lectures or other such presentations, and more particularly to improving the recording of classroom lectures or other such presentations by detecting and correcting whiteboard images while enabling the removal of the speaker or presenter.

BACKGROUND

Current methods of recording classroom lectures or other such presentations either involve audio recording only, or simple video recording of the lecture scene without processing. Simple audio recording is far less useful than visualization of an accompanying whiteboard image. However, simple video recording gives a visual signal that is hard to interpret because of geometric distortion, poor acquisition conditions, the obstruction of an occluding, moving speaker, and poor color reproduction.

Hence, the current methods of recording classroom lectures or other such presentations are simply limited to taking an audio and/or video recording of the whiteboard during a lecture or presentation thereby limiting the visual and educational experience of the viewer.

SUMMARY

In one embodiment of the present invention, a method for improving the recording of presentations comprises receiving a video frame containing a whiteboard image. The method further comprises converting the video frame to an image containing the whiteboard image. The method additionally comprises detecting boundaries of the whiteboard image in the converted image. Furthermore, the method comprises classifying the detected boundaries as a horizontal or a vertical line. Additionally, the method comprises forming quadrangles using spatial arrangements of the horizontal and vertical lines. In addition, the method comprises identifying, by a processor, one or more quadrangles most likely to spatially coincide with the boundaries of the whiteboard image. The method further comprises cropping, by the processor, an area in the video frame corresponding to the identified one or more quadrangles in the whiteboard image.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The principles of the present invention provide a new and easy way to automatically detect, optimize for readability, and share a whiteboard image from a video source. A "whiteboard," as used herein, includes markerboards, dry-erase boards, dry-wipe boards, pen-boards, blackboards, smart whiteboards, digital whiteboards and smart screens. A "whiteboard image," as used herein, refers to an image from such a whiteboard. The main technical challenge in detecting and sharing a whiteboard image from a video source is detecting a white rectangle in an image frame. The principles of the present invention provide an algorithm that automatically performs this task in a variety of situations. Additionally, the perspective is corrected, the colors are optimized and a "professor hiding" or "speaker/presenter hiding" algorithm is implemented. These whiteboard images may then be stored on a server which can be viewed at a later point in time by other users.

The principles of the present invention automate the task of sharing a whiteboard image with colleagues or peers. This is a common function done in meetings and lectures, especially when the conference room is not outfitted with appropriate video conferencing equipment. Additionally, saving and archiving whiteboard information for later viewing is a common use case for students. By making this task more automatic, less expensive, and more portable, the task of sharing a whiteboard stream and in general the ability to teleconference in education, healthcare, and corporate scenarios are improved.

While the following discusses the present invention in connection with computing devices with an internal video camera, the principles of the present invention may be applied to a digital camera or any type of electronic device with an internal video camera or connected to a video camera. A person of ordinary skill in the art would be capable of applying the principles of the present invention to such implementations. Further, embodiments applying the principles of the present invention to such implementations would fall within the scope of the present invention.

Furthermore, while the following discusses the present invention in connection with a flat display, the principles of the present invention may be applied to a curved display. A person of ordinary skill in the art would be capable of applying the principles of the present invention to such implementations. Further, embodiments applying the principles of the present invention to such implementations would fall within the scope of the present invention.

Figure 1:
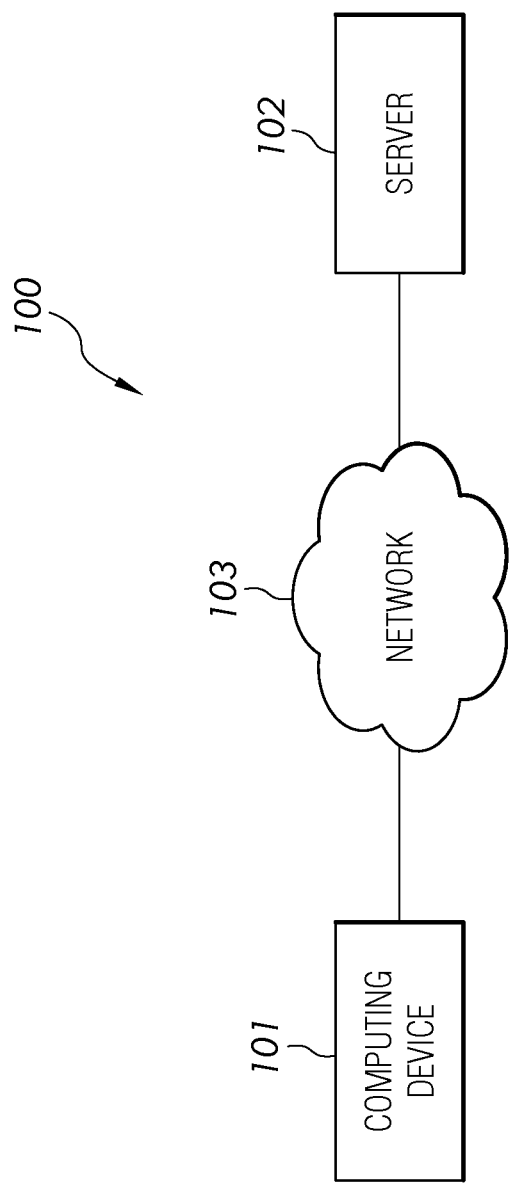
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes a computing device 101 connected to a server 102 via a network 103.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of recording video images of a classroom lecture or other such presentations where the recording of the presentation is improved by detecting and correcting whiteboard images while enabling the removal of the speaker or presenter as discussed below. Computing device 101 has the capability of connecting to network 103 and consequently communicating with server 102, which is configured to store the corrected whiteboard images from computing device 101 which may be later retrieved by other users, such as other computing devices which are not shown in FIG. 1. A description of the hardware configuration of computing device 101 is provided below in connection with FIG. 2.

System 100 is not to be limited in scope to any one particular network architecture. System 100 may include any number of computing devices 101, servers 102 and networks 103.

Figure 2:
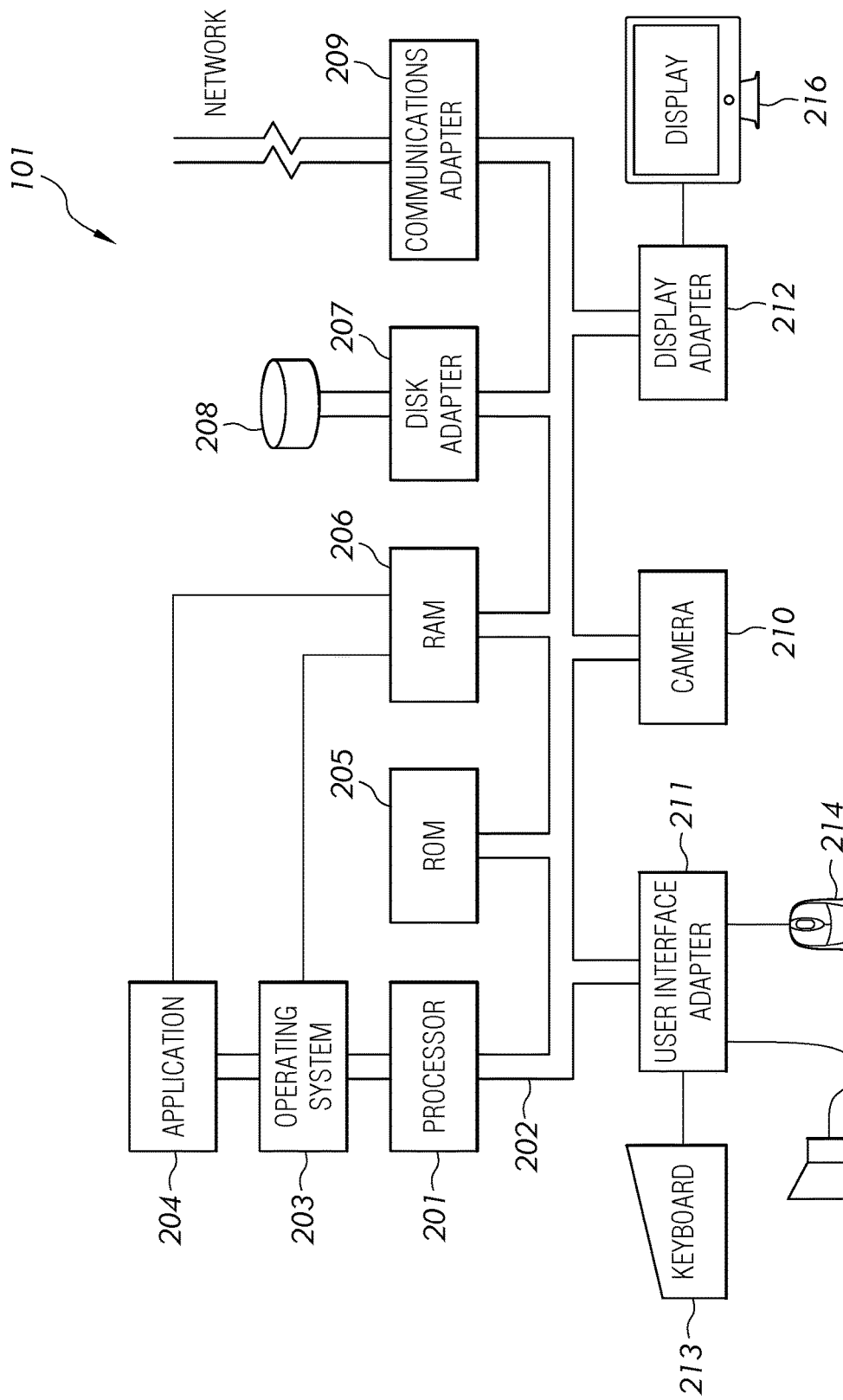
FIG. 2 illustrates a hardware configuration of a computing device configured in accordance with an embodiment of the present invention.

Referring now to FIG. 2, FIG. 2 illustrates a hardware configuration of computing device 101 which is representative of a hardware environment for practicing the present invention. Referring to FIG. 2, computing device 101 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, an application for detecting and correcting whiteboard images in video frames while enabling the removal of the speaker or presenter as discussed below in association with FIGS. 3-6.

Referring again to FIG. 2, read-only memory ("ROM") 205 may be coupled to system bus 202 and include a basic input/output system ("BIOS") that controls certain basic functions of computing device 101. Random access memory ("RAM") 206 and disk adapter 207 may also be coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for detecting and correcting whiteboard images in video frames while enabling the removal of the speaker or presenter, as discussed below in association with FIGS. 3-6, may reside in disk unit 208 or in application 204.

Computing device 101 may further include a communications adapter 209 coupled to bus 202. Communications adapter 209 may interconnect bus 202 with an outside network (e.g., network 103 of FIG. 1) thereby allowing computing device 101 to communicate with other devices (e.g., server 102 of FIG. 1).

Computing device 101 may further include a camera 210 (e.g., webcam) configured to capture images of a presentation, such as a classroom lecture, where the recording of the presentation is improved by detecting and correcting whiteboard images in the video frames while enabling the removal of the speaker or presenter as discussed below.

I/O devices may also be connected to computing device 101 via a user interface adapter 211 and a display adapter 212. Keyboard 213, mouse 214 and speaker 215 may all be interconnected to bus 202 through user interface adapter 211. A display monitor 216 may be connected to system bus 202 by display adapter 212. In this manner, a user is capable of inputting to computing device 101 through keyboard 213 or mouse 214 and receiving output from computing device 101 via display 216 or speaker 215. Other input mechanisms may be used to input data to computing device 101 that are not shown in FIG. 2, such as display 216 having touch-screen capability and keyboard 213 being a virtual keyboard. Computing device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, current methods of recording classroom lectures or other such presentations either involve audio recording only, or simple video recording of the lecture scene without processing. Simple audio recording is far less useful than visualization of an accompanying whiteboard image. However, simple video recording gives a visual signal that is hard to interpret because of geometric distortion, poor acquisition conditions, the obstruction of an occluding, moving speaker, and poor color reproduction. Hence, the current methods of recording classroom lectures or other such presentations are simply limited to taking an audio and/or video recording of the whiteboard during a lecture or presentation thereby limiting the visual and educational experience of the viewer.

Figure 3:
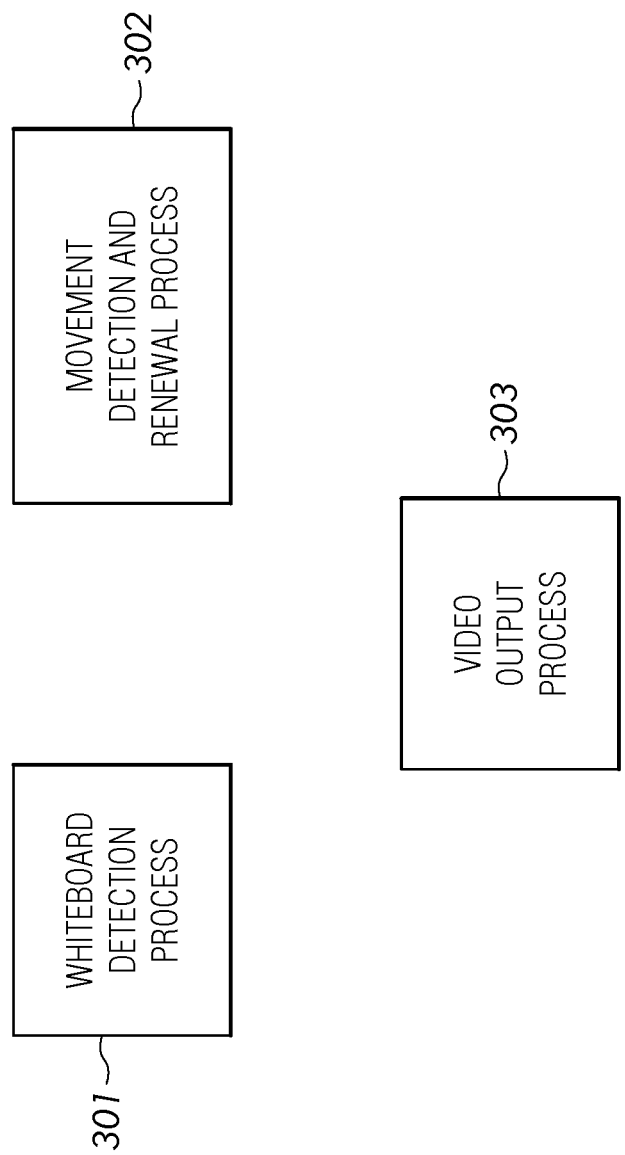
FIG. 3 illustrates the software components in the computing device used in connection with detecting and correcting whiteboard images in the video frames while enabling the removal of the speaker or presenter in accordance with an embodiment of the present invention.
Figure 4:
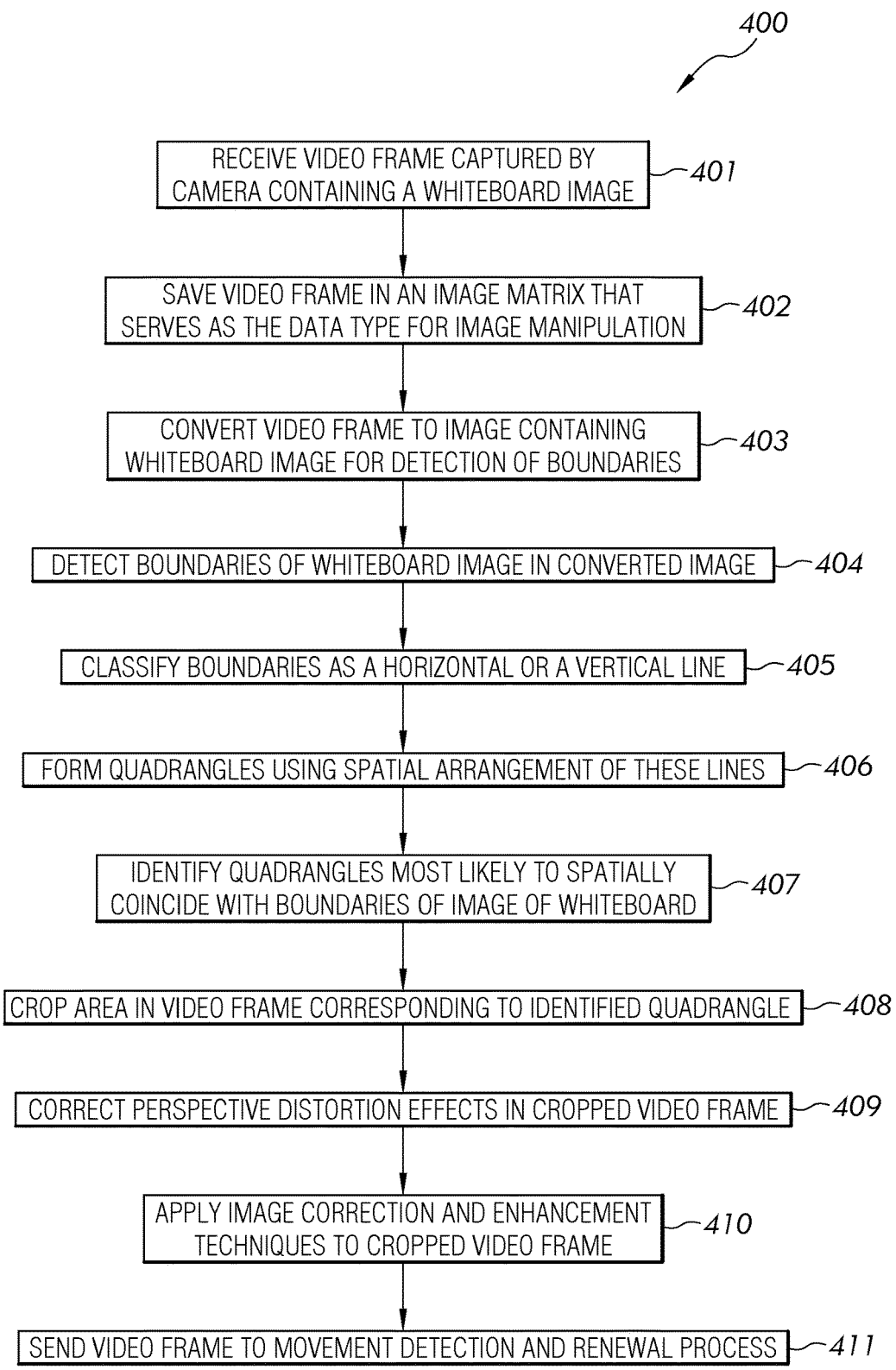
FIG. 4 is a flowchart of a method for detecting and correcting whiteboard images in video frames in accordance with an embodiment of the present invention.
Figure 5:
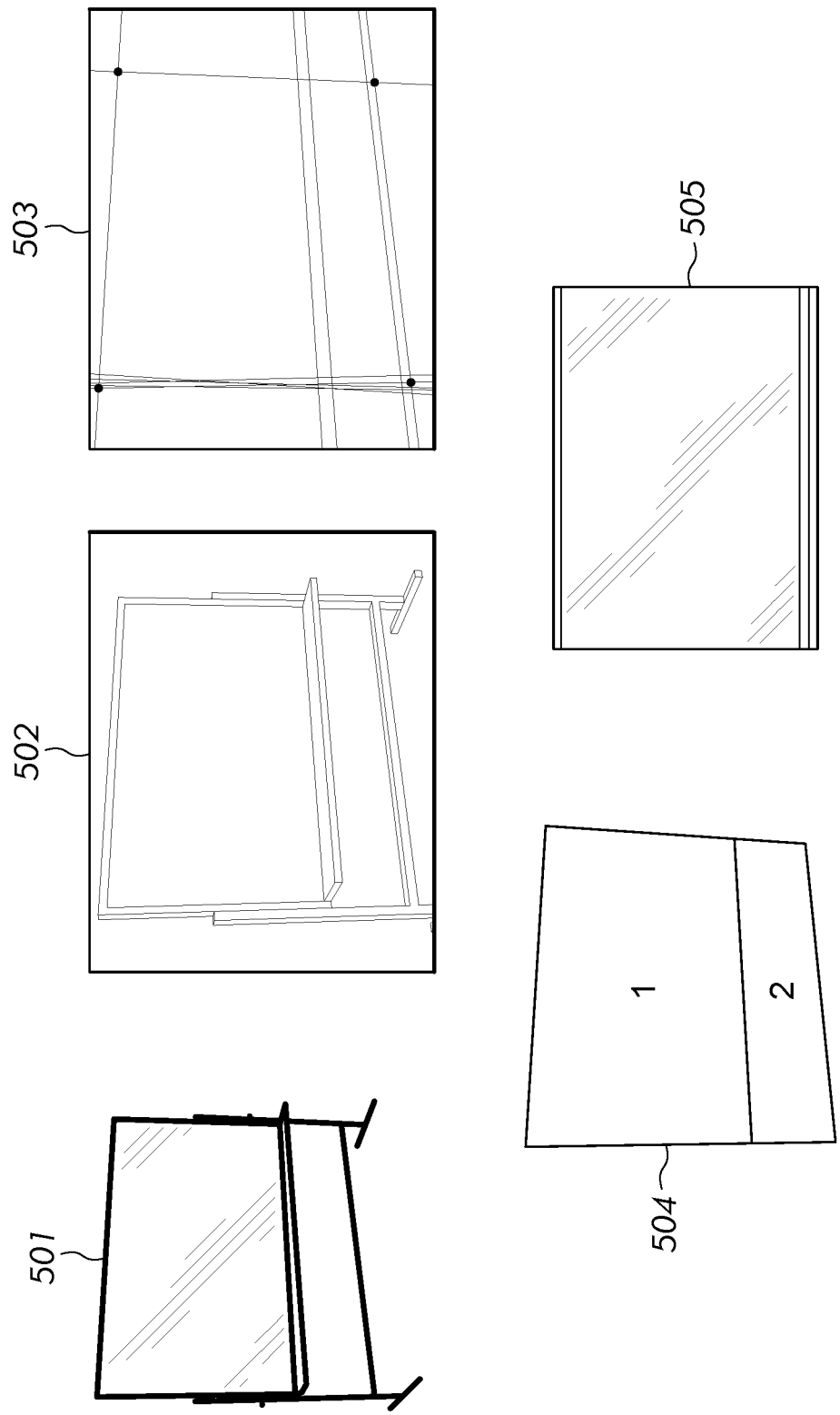
FIG. 5 illustrates the process of detecting and correcting whiteboard images in visual form in accordance with an embodiment of the present invention.
Figure 6:
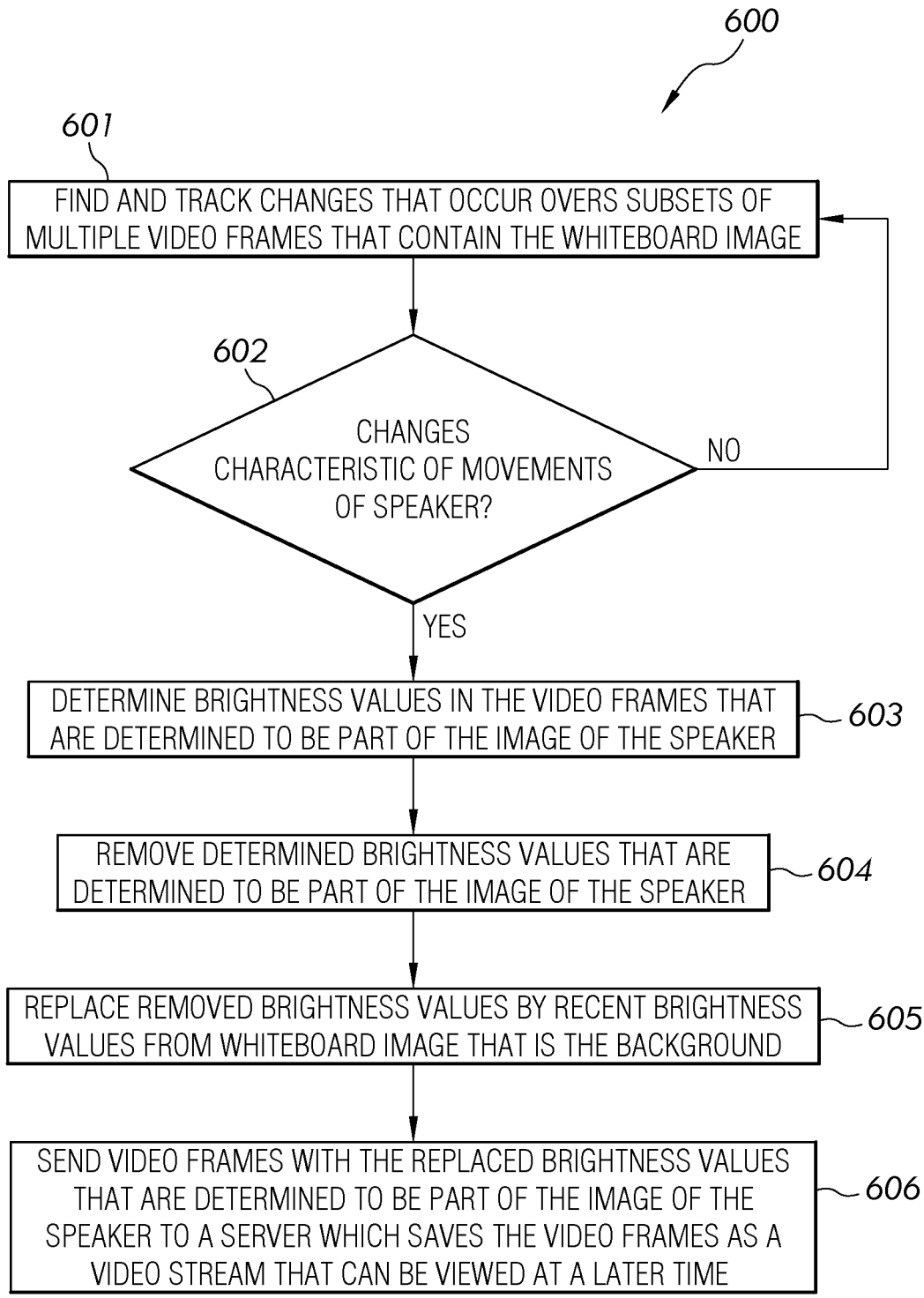
FIG. 6 is a flowchart of a method for removing the speaker or presenter from the video frame to ensure that only the whiteboard image appears in accordance with an embodiment of the present invention.

The principles of the present invention provide a means for improving the visual and educational experience involved in the recording of classroom lectures or other such presentations by detecting and correcting whiteboard images in the video frames while enabling the removal of the speaker or presenter as discussed below in connection with FIGS. 3-6. FIG. 3 illustrates the software components in computing device 101 (FIGS. 1 and 2) used in connection with detecting and correcting whiteboard images in the video frames while enabling the removal of the speaker or presenter. FIG. 4 is a flowchart of a method for detecting and correcting whiteboard images in video frames. FIG. 5 illustrates the process of detecting and correcting whiteboard images in visual form. FIG. 6 is a flowchart of a method for removing the speaker or presenter from the video frame to ensure that only the whiteboard image appears.

As stated above, FIG. 3 illustrates the software components in computing device 101 (FIGS. 1 and 2) used for detecting and correcting whiteboard images in video frames while enabling the removal of the speaker or presenter in accordance with an embodiment of the present invention. In one embodiment, these software components may reside in application 204 (FIG. 2).

The following provides a brief description of these software components. A more detailed description of these software components (including their functionalities) is provided below in conjunction with FIGS. 4-6.

Referring to FIG. 3, in conjunction with FIGS. 1-2, computing device 101 includes what is referred to herein as the "whiteboard detection process" 301 which is configured to detect and correct whiteboard images in the video frames. A "whiteboard," as used herein, includes markerboards, dry-erase boards, dry-wipe boards, pen-boards, blackboards, smart whiteboards, digital whiteboards and smart screens. A "whiteboard image," as used herein, refers to an image from such a whiteboard.

Computing device 101 further includes a movement detection and renewal process 302 configured to remove the speaker or presenter from the video frame.

Computing device 101 additionally includes a video output process 303 configured to output a refined and easily viewable video stream consisting of just the whiteboard image.

A further discussion regarding the functionality of these software components is provided below in connection with FIGS. 4-6.

FIG. 4 is a flowchart of a method 400 for detecting and correcting whiteboard images in video frames in accordance with an embodiment of the present invention.

Referring to FIG. 4, in conjunction with FIGS. 1-3, in step 401, whiteboard detection process 301 receives a video frame captured by camera 210 containing a whiteboard image.

In step 402, whiteboard detection process 301 saves the video frame in an image matrix that serves as the data type for image manipulation. For example, the video frame may be stored in an image matrix, which is stored in a data storage unit (e.g., memory 206 or auxiliary storage device 208 of computing device 101).

In step 403, whiteboard detection process 301 converts the video frame to an image (e.g., black and white image, color image) (referred to herein as the "converted image") for the detection of boundaries.

In step 404, whiteboard detection process 301 detects the boundaries of the whiteboard image in the converted image. In one embodiment, the converted image (e.g., black and white image) is run through a Hough transform, where this transform highlights all the straight lines present in the image.

In step 405, whiteboard detection process 301 classifies the boundaries in the converted image as a horizontal or a vertical line. In one embodiment, where the display, such as display 216 is curved, such curves would be taken into consideration and the boundaries in the converted image would be classified in terms of straight horizontal or vertical lines.

In step 406, whiteboard detection process 301 forms the quadrangles using spatial arrangements of these lines.

In step 407, whiteboard detection process 301 identifies the quadrangles most likely to spatially coincide with the boundaries of the image of the whiteboard. In one embodiment, whiteboard detection process 301 forms the quadrangles using spatial arrangements of lines by finding four lines that intersect at approximately 90 degrees, with an error rate of 30 degrees to allow for distortion. The quadrangles are then sorted (ranked) based on specific characteristics, such as size and position. For example, quadrangles that fall below a fixed pixel area threshold are discarded since they cannot hold discernible information on the screen.

In the event that the whiteboard is a curved display, then detection of appropriate curved lines would be detected, e.g., by a modified Hough transform, with suitably modified intersecting angles. This could be accomplished by using known curved dimensions of available displays or by detecting curved lines with appropriate ranges of parameters and angles.

In step 408, whiteboard detection process 301 crops the area in the video frame corresponding to the identified quadrangle.

In step 409, whiteboard detection process 301 corrects the perspective distortion effects in the cropped video frame, such as adjusting the perspective of the whiteboard image to give it a head-on view.

In step 410, whiteboard detection process 301 applies the image correction and enhancement techniques to the cropped video frame, such as refining the color of the whiteboard image. In one embodiment, the color of the whiteboard image is enhanced by estimating the background color of the blank whiteboard, adjusting the background to pure white and enhancing the markings on the whiteboard as shown in FIG. 5.

FIG. 5 illustrates the process of steps 404-410 in visual form in accordance with an embodiment of the present invention.

Referring to FIG. 5, after the video frame is converted to an image 501 (e.g., black and white image), edges or boundaries are found (step 404), such as shown in image 502, where such boundaries are classified as either horizontal or vertical (step 405), such as shown in image 503. Quadrangles are then formed using spatial arrangements of lines (step 406) and the quadrangles are ranked based on specific characteristics (step 407), such as size and position, such as shown in image 504. The area corresponding to the identified quadrangle in the video frame is then cropped (step 408) and the image is enhanced and corrected (steps 409-410), such as shown in image 505.

Returning to FIG. 4, in conjunction with FIGS. 1-3 and 5, in step 411, whiteboard detection process 301 sends the video frame to the movement detection and renewal process 302. The speaker or presenter may be removed from the video frame containing the whiteboard image as discussed below.

FIG. 6 is a flowchart of a method 600 for removing the speaker or presenter from the video frame to ensure that only the whiteboard image appears in accordance with an embodiment of the present invention.

Referring to FIG. 6, in conjunction with FIGS. 1-5, in step 601, movement detection and renewal process 302 finds and tracks changes that occur overs subsets of multiple video frames (such as the video frames provided in step 411) containing the whiteboard image.

In step 602, a determination is made by movement detection and renewal process 302 as to whether the changes are characteristic of movements of a speaker. For example, in one embodiment, movement detection and renewal process 302 finds where change is occurring in the image by comparing color values from frame to frame. If change in a region is above a certain threshold, then that region of the whiteboard is considered obscured by foreground objects, such as a speaker, and the output in that region is not updated. In one embodiment, a circular buffer of color values is kept for each of the regions in the image. The mode, or most commonly occurring color, in this data set is the output for that region. If the region is marked as changing, the data set is not updated with new values, and the old mode value will remain the same until new non-changing color values are available for the region. In one embodiment, the circular buffer is stored in a data storage unit of computing device 101 (e.g., memory 206, auxiliary storage device 208).

If such changes are not characteristic of movements of a speaker, then movement detection and renewal process 302 continues to find and track changes that occur overs subsets of multiple frames containing the whiteboard image in step 601.

If, however, such changes are characteristic of movements of a speaker, then, in step 603, movement detection and renewal process 302 determines the brightness values in the video frames that are determined to be part of the image of the speaker.

In step 604, movement detection and renewal process 302 removes the determined brightness values that are determined to be part of the image of the speaker.

In step 605, movement detection and renewal process 302 replaces the removed brightness values by the recent brightness values from the whiteboard image that is the background. This has the effect of providing a persistent view of the whiteboard image while subtracting the image of the speaker. Changes arising from actual additions or deletions (e.g., writing or drawing) on the whiteboard itself are distinguished from changes arising from the speaker, including shadows and lighting changes, by measurements related to spatial area and temporal persistency.

In step 606, video output process 303 sends the video frames with the replaced brightness values that are determined to be part of the image of the speaker (these are the resulting whiteboard images) to server 102, which saves the video frames as a video stream that can be viewed at a later time, such as by other users via network 103. In one embodiment, video output process 303 stores the entire history of the whiteboard images from the movement detection and renewal process 302, such as in a data storage unit of computing device 101 (e.g., memory 206, auxiliary storage device 208), and broadcasts the most recent image on a ZeroMQ (high-performance asynchronous messaging library) socket to server 102.

Once the resulting whiteboard video frames are stored in server 102, they may be viewed at any time via a wireless or wired connection to server 102 using an application or website access by any standard computer device, such as a personal computer, smartphone or tablet.

In one embodiment, video output process 303 may subject the resulting whiteboard video frames to video encoding to compress them for more efficient transmission to server 102 and storage in server 102.

The principles of the present invention provide a means for automatically detecting, enhancing and sharing of a whiteboard image. The principles of the present invention create a seamless way to detect and extract a whiteboard image and reduce the difficulty of sharing a whiteboard image. The application of the present invention receives video frames that contain a whiteboard image, and outputs the whiteboard image closely cropped, perspective corrected, and color enhanced to a server. The speaker may be removed from the video frame, where the resulting whiteboard image without the speaker is sent to a server (e.g., server 102) via a ZeroMQ socket.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for improving the recording of presentations, the method comprising:
   receiving a video frame containing a whiteboard image;
   converting said video frame to an image containing said whiteboard image;
   detecting boundaries of said whiteboard image in said converted image;
   classifying said detected boundaries as a horizontal or a vertical line;
   forming quadrangles using spatial arrangements of said horizontal and vertical lines;
   identifying, by a processor, one or more quadrangles most likely to spatially coincide with said boundaries of said whiteboard image; and
   cropping, by said processor, an area in said video frame corresponding to said identified one or more quadrangles in said whiteboard image.

2. The method as recited in claim 1 further comprising:
   saving said video frame in an image matrix that serves as a data type for image manipulation.

3. The method as recited in claim 1 further comprising:
   correcting perspective distortion effects in said cropped video frame.

4. The method as recited in claim 3 further comprising:
   applying an image correction and enhancement techniques to said cropped video frame.

5. The method as recited in claim 1 further comprising:
   finding and tracking changes that occur over subsets of multiple video frames that contain said whiteboard image.

6. The method as recited in claim 5 further comprising:
   determining brightness values in said multiple video frames that are determined to be part of an image of a speaker in response to said changes being determined to be characteristic of movements of said speaker.

7. The method as recited in claim 6 further comprising:
   removing said determined brightness values in said multiple video frames that are determined to be part of said image of said speaker; and
   replacing said removed brightness values by recent brightness values from said whiteboard image.

8. The method as recited in claim 7 further comprising:
   sending said multiple video frames with said replaced brightness values that are determined to be part of said image of said speaker to a server which saves said multiple video frames as a video stream that can be viewed at a later time.

9. A computer program product for improving the recording of presentations, the computer program product comprising a non-transitory computer readable storage medium having program code embodied therewith, the program code comprising the programming instructions for:
   receiving a video frame containing a whiteboard image;
   converting said video frame to an image containing said whiteboard image;
   detecting boundaries of said whiteboard image in said converted image;
   classifying said detected boundaries as a horizontal or a vertical line;
   forming quadrangles using spatial arrangements of said horizontal and vertical lines;
   identifying one or more quadrangles most likely to spatially coincide with said boundaries of said whiteboard image; and cropping an area in said video frame corresponding to said identified one or more quadrangles in said whiteboard image.

10. The computer program product as recited in claim 9, wherein the program code further comprises the programming instructions for:
saving said video frame in an image matrix that serves as a data type for image manipulation.

11. The computer program product as recited in claim 9, wherein the program code further comprises the programming instructions for:
correcting perspective distortion effects in said cropped video frame.

12. The computer program product as recited in claim 11, wherein the program code further comprises the programming instructions for:
applying an image correction and enhancement techniques to said cropped video frame.

13. The computer program product as recited in claim 9, wherein the program code further comprises the programming instructions for:
finding and tracking changes that occur over subsets of multiple video frames that contain said whiteboard image.

14. The computer program product as recited in claim 13, wherein the program code further comprises the programming instructions for:
determining brightness values in said multiple video frames that are determined to be part of an image of a speaker in response to said changes being determined to be characteristic of movements of said speaker.

15. The computer program product as recited in claim 14, wherein the program code further comprises the programming instructions for:
removing said determined brightness values in said multiple video frames that are determined to be part of said image of said speaker; and
replacing said removed brightness values by recent brightness values from said whiteboard image.

16. The computer program product as recited in claim 15, wherein the program code further comprises the programming instructions for:
sending said multiple video frames with said replaced brightness values that are determined to be part of said image of said speaker to a server which saves said multiple video frames as a video stream that can be viewed at a later time.

17. A system, comprising:
a memory unit for storing a computer program for improving the recording of presentations; and
a processor coupled to the memory unit, wherein the processor is configured to execute the program instructions of the computer program comprising:
receiving a video frame containing a whiteboard image;
converting said video frame to an image containing said whiteboard image;
detecting boundaries of said whiteboard image in said converted image;
classifying said detected boundaries as a horizontal or a vertical line;
forming quadrangles using spatial arrangements of said horizontal and vertical lines;
identifying one or more quadrangles most likely to spatially coincide with said boundaries of said whiteboard image; and
cropping an area in said video frame corresponding to said identified one or more quadrangles in said whiteboard image.

18. The system as recited in claim 17, wherein the program instructions of the computer program further comprise:
saving said video frame in an image matrix that serves as a data type for image manipulation.

19. The system as recited in claim 17, wherein the program instructions of the computer program further comprise:
correcting perspective distortion effects in said cropped video frame.

20. The system as recited in claim 19, wherein the program instructions of the computer program further comprise:
applying an image correction and enhancement techniques to said cropped video frame.

21. The system as recited in claim 17, wherein the program instructions of the computer program further comprise:
finding and tracking changes that occur over subsets of multiple video frames that contain said whiteboard image.

22. The system as recited in claim 21, wherein the program instructions of the computer program further comprise:
determining brightness values in said multiple video frames that are determined to be part of an image of a speaker in response to said changes being determined to be characteristic of movements of said speaker.

23. The system as recited in claim 22, wherein the program instructions of the computer program further comprise:
removing said determined brightness values in said multiple video frames that are determined to be part of said image of said speaker; and
replacing said removed brightness values by recent brightness values from said whiteboard image.

24. The system as recited in claim 23, wherein the program instructions of the computer program further comprise:
sending said multiple video frames with said replaced brightness values that are determined to be part of said image of said speaker to a server which saves said multiple video frames as a video stream that can be viewed at a later time.

* * * * *